June 14, 1949.  J. S. J. HLOBIL  2,472,947
UNIVERSAL CARGO AIRCRAFT
Filed Jan. 19, 1945  5 Sheets-Sheet 1
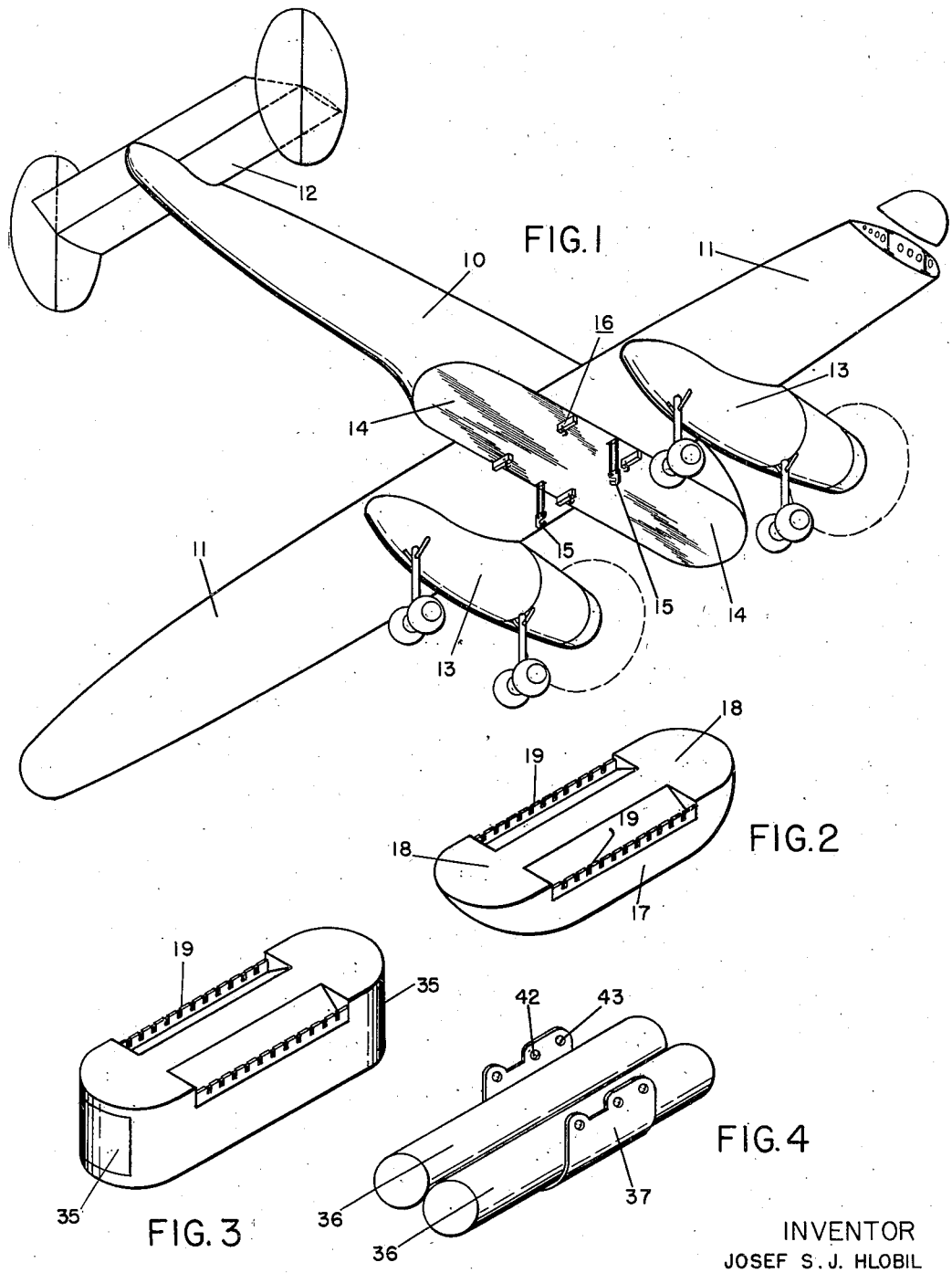
INVENTOR
JOSEF S. J. HLOBIL
BY F.R.Geisler
ATTORNEY June 14, 1949.  J. S. J. HLOBIL  2,472,947
UNIVERSAL CARGO AIRCRAFT
Filed Jan. 19, 1945  5 Sheets-Sheet 2

INVENTOR.
JOSEF S. J. HLOBIL
BY
ATTORNEY

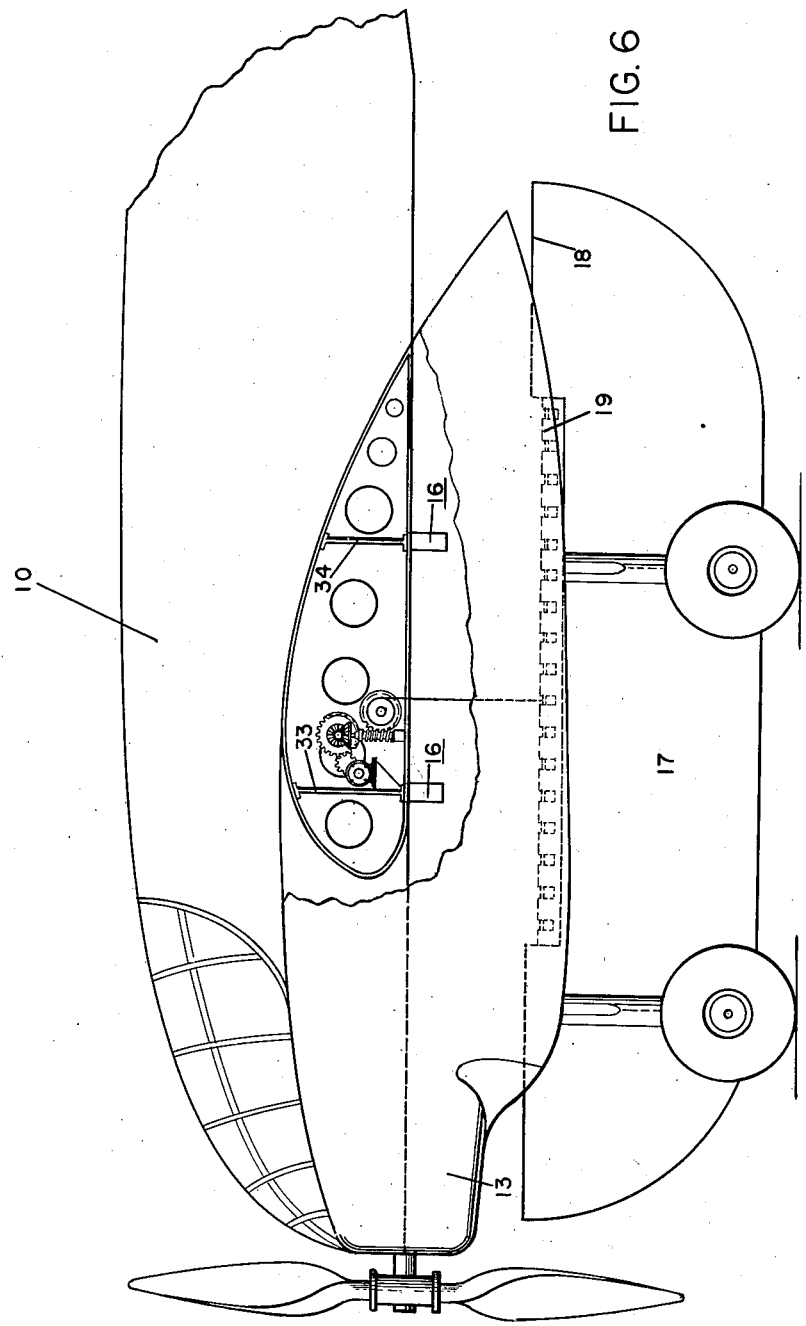

June 14, 1949.  J. S. J. HLOBIL  2,472,947
UNIVERSAL CARGO AIRCRAFT
Filed Jan. 19, 1945  5 Sheets-Sheet 4

INVENTOR
JOSEF S. J. HLOBIL.
BY
ATTORNEY

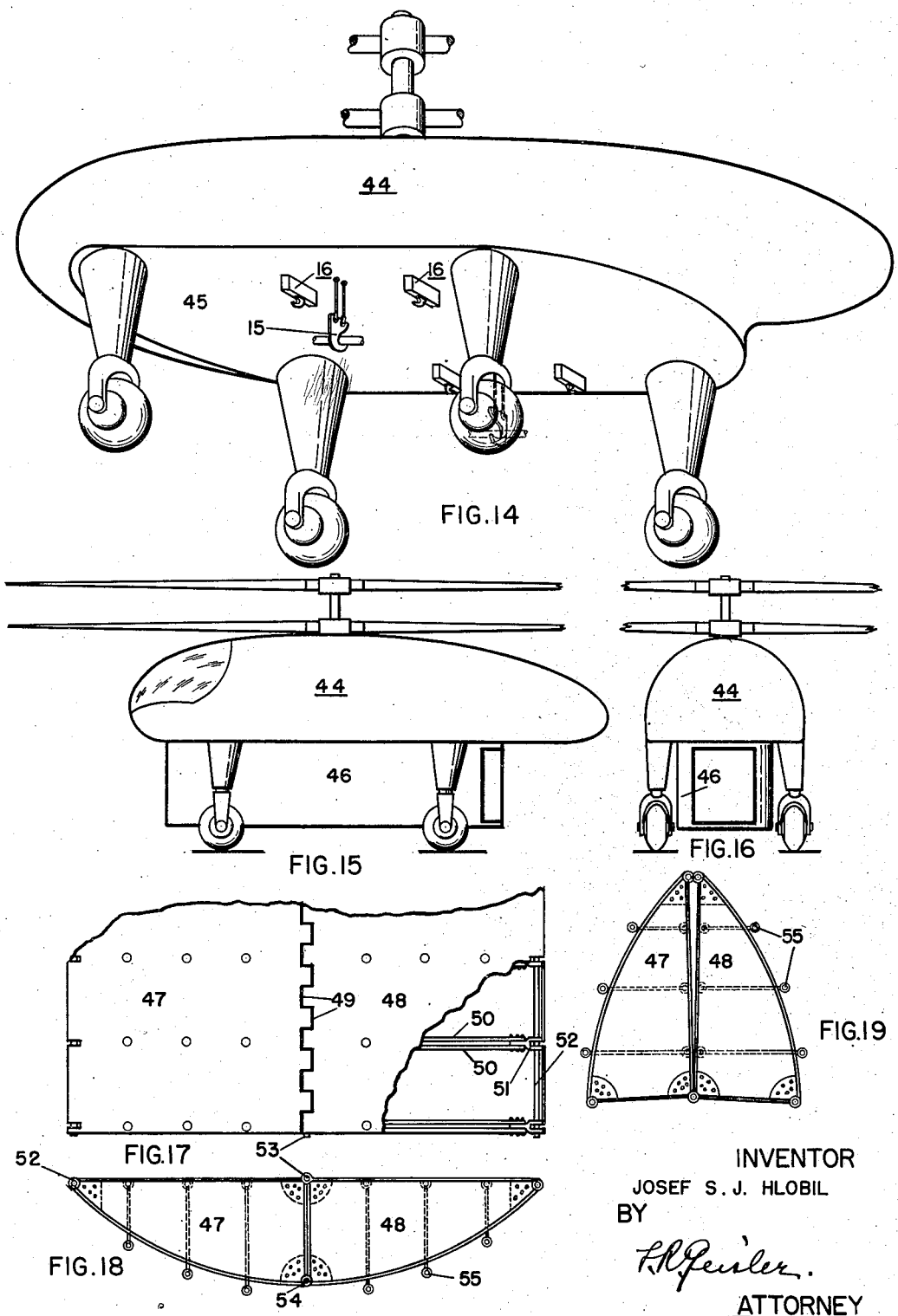

Patented June 14, 1949

2,472,947

UNITED STATES PATENT OFFICE 2,472,947

UNIVERSAL CARGO AIRCRAFT

Josef S. J. Hlobil, Portland, Oreg.

Application January 19, 1945, Serial No. 573,511

1 Claim. (Cl. 244—118)

This invention relates particularly to airplanes and the like designed for use as carriers of freight and cargoes of various kinds.

With ordinary airplanes, and with the types of airplanes now being constructed, it is not feasible or even possible to transport all kinds of cargo by air. Some articles and materials, by reason of their particular or delicate nature, have heretofore not been regarded as suited to air transportation. This has been true, for example, of certain foods and delicate chemicals which require protection from extreme variations of temperature or atmospheric pressure, or which require other special packing to avoid danger of injury. While exceptional provisions can be made for transporting such materials by air in small quantities in a special emergency, the extra time and expense involved have prevented the use of air transportation on a wider scale for such materials. Other articles, by reason of their peculiar shape or dimensions, cannot be carried by ordinary aircraft.

Another problem with the transportation of freight by air, as at present carried on, is the necessity for the proper distribution of the cargo weight in the airplane so that proper balance may be maintained. This requirement often necessitates considerable time and care in the loading of a cargo-carrying airplane, and, when only part of the cargo is unloaded, further rearranging of the remaining cargo in the airplane may be necessary. Such delays in extra handling naturally increase the cost of air transportation of freight.

One of the objects of this invention is to provide an improved type of cargo-carrying airplane by which special kinds of freight, heretofore not considered adapted for air transportation, can be carried as readily as any other kinds of freight now commonly transported by air.

Another object of this invention is to provide a cargo airplane in which the cargo will be carried in a special compartment located below the wing spars of the wing center section, instead of being carried in the fuselage or in the wings, so that oversized and odd sized pieces of freight can readily be accommodated.

A further object is to provide an improved cargo airplane with a special freight compartment which can be detached from the main body of the airplane and handled as a separate unit, thus enabling such compartment to be loaded or unloaded while away from the airplane and thus enabling the loading or unloading to be performed under more efficient conditions and at the same time making possible other use of the airplane during the time required for such loading or unloading.

An additional object of this invention is to provide a moderate size airplane with a removable freight compartment and to provide means by which the position of the compartment may be adjusted on the airplane in order to obtain proper balancing of the airplane regardless of the actual distribution of weight in the freight compartment itself, thus eliminating the necessity of reloading or repacking such freight compartment when the weight of the freight in the compartment is not evenly or properly distributed.

A still further object is to provide a simple means for attaching such a separate freight compartment to a carrier plane in which the desired proper weight distribution of the loaded plane can be immediately indicated and the compartment so attached as to attain such weight balancing without delay.

Another important object of this invention is to provide a carrier airplane which can be used in combination with any one of a number of different freight compartments, either large or small in size, and of an extensive variety of shapes, and to provide compartments constructed for special service requirements and, further, to arrange each compartment so that it can be attached to or detached from the carrier airplane in the same manner and with equal facility regardless of the size, shape or contents of the freight compartment.

These objects, and other advantages, I attain by constructing a carrier airplane adapted to having attached to it a special freight compartment, by arranging to have the cabin, fuselage and wings of the airplane all located above the horizontal plane determined by the top of the freight compartment where attached to the airplane, and by constructing the freight compartments and arranging the means for attaching and securing each compartment to its carrier airplane in the manner hereinafter briefly described with reference to the accompanying drawings.

In the drawings:

Figure 1 is a view in isometric perspective, taken from below, of a cargo airplane constructed in accordance with my invention, but with the freight compartment entirely removed from the airplane, the airplane being designed for use either with or without the freight compartment;

Figure 2 is an illustration of one type of freight compartment adapted to be attached to and used with the airplane of Figure 1;

Figures 3, 4 and 5 are similar illustrations of other types of freight compartments adapted for use with the cargo airplane, the type of the compartment depending upon the nature of the freight or cargo to be carried;

Figure 6 is a fragmentary side elevation, with the near side wing broken away, of the airplane of Figure 1, showing the airplane resting with its landing gear on the ground and the freight compartment of Figure 2 in position under the airplane and ready to be raised and locked in place;

Figure 14 is a view in isometric perspective of a helicopter constructed in accordance with my invention;

Figures 15 and 16 are side and end elevations respectively of the helicopter of Figure 14 with a freight compartment secured in place;

Figure 17 is a fragmentary top plan view of a special cargo-supporting frame adapted to be secured to the airplane;

Figure 18 is an end view of the same cargo frame; and

Figure 19 is a similar end view showing the cargo frame in folded position for convenience when the same is not being used.

Figure 7:
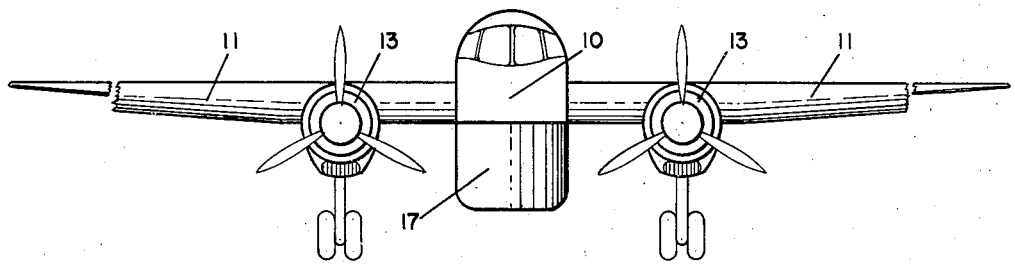
Figure 7 is a front view of the same airplane showing the same freight compartment secured to the airplane for transportation.

Referring first to Figure 1, the carrier airplane includes the usual fuselage body 10, wings 11, tail section and rudders 12, and nacelles 13 with retractable landing gears, motors and propellors. The main distinction between the design of this cargo airplane and ordinary airplanes is that the bottom 14 of the main body section or portion of the fuselage below the central wing section is a substantially flat surface and, furthermore, as shown more clearly in Figures 6, 8 and 9, the bottom contour of the wings cannot be below this flat bottom surface, and in fact no portion of the airplane itself extends below this flat buttom surface 14 except the nacelles and the bottom tips of the two spaced vertical rudders. The importance of this feature will become apparent with the further description of the utility of the cargo airplane.

Figures 10, 11:
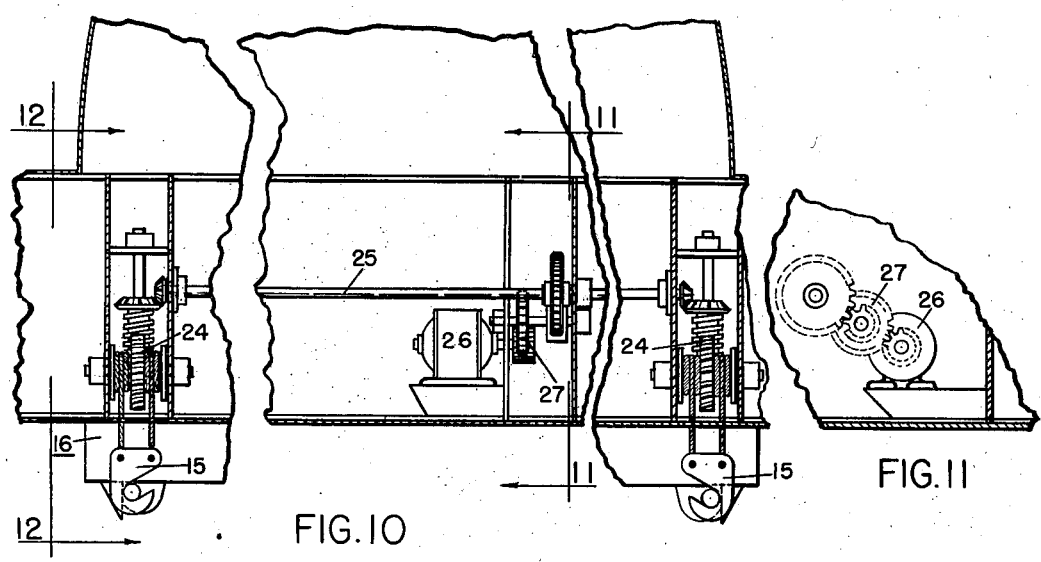
Figure 10 is a fragmentary and more or less diagrammatic transverse section through the central wing body portion of the airplane, corresponding to line 10—10 of Figure 12.
Figure 11 is a fragmentary section on line 11—11 of Figure 10, showing the driving gears for the hoisting mechanism.

The airplane is equipped with a pair of hoisting hooks 15 (shown more clearly in Figure 10) on the ends of cables extending downward from each side of the central body portion, and is also provided with four locking devices 16 for securing the cargo compartment to the airplane. These hoists and locking devices will be described more fully later and they are operated by suitable mechanism located within the airplane body.

Figure 12:
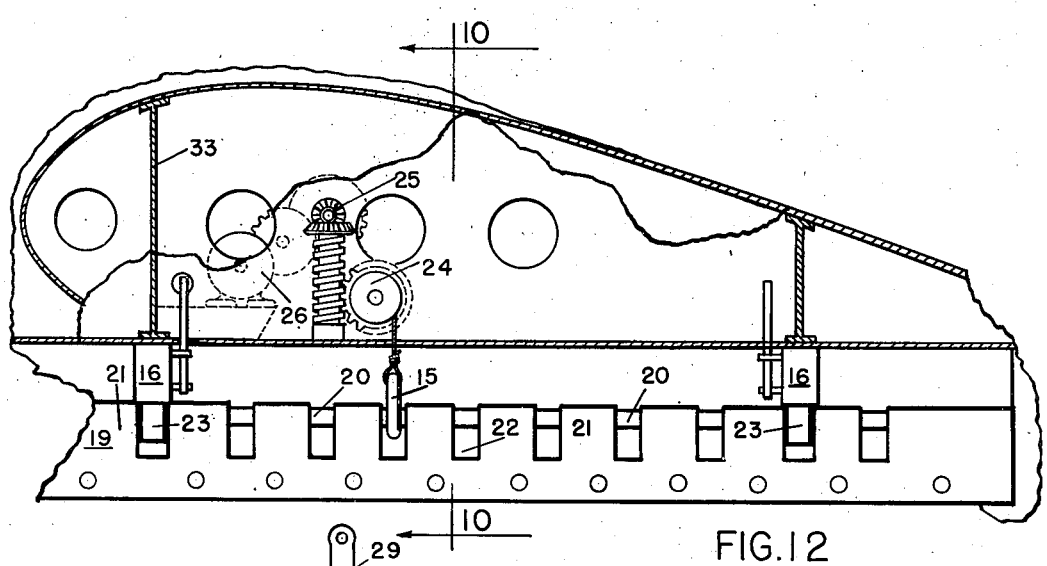
Figure 12 is a fragmentary section through the wing body portion of the airplane, similar in part to Figure 6 and showing the freight compartment in attached position, this section also corresponding to the line 12—12 of Figure 10.

In Figure 2 I show one type of freight compartment adapted to be employed in my invention. This compartment has an oval tub-shaped body 17, and the compartment has two flat top deck sections 18 at each end. A securing rail 19 is formed at the top of each side of the compartment, extending along each side between the deck portions 18 and located slightly below the top of the deck portions. The securing rail 19 on each side is shown more clearly in Figure 12. This securing rail may be formed in a number of different ways but the particular rail illustrated in Figure 12 comprises a bar 20, extending the full length of the rail, with a metal sheet 21 looped over the bar, both ends of the metal sheet then being secured to the body structure of the freight compartment. A number of cutout portions 22 of the same size in the metal sheet 21 are equally spaced along the rail, as shown in Figure 12, to furnish holds for the hoisting hooks 15, enabling the hoisting hooks to engage the bar 20 in lifting the compartment into position, and also furnishing similar holds for the locking devices 16 to enable the locking hooks 23 (Fig. 13) of the locking devices to engage the bar 20 similarly when the compartment is locked into position on the airplane.

The hoisting hook 15 for each side (see Fig. 10) is attached to the ends of a pair of cables carried on drums connected with a worm gear 24. The two worm gears are driven in unison from a horizontal shaft 25 through the intermediary of suitable gear connections, the shaft 25 being driven in any suitable manner, for example, by a reversible motor 26 and gear chain 27 (also shown in Fig. 11). Thus, operation of the motor 26 in one direction will lower the hoisting hooks 15, and operation in the opposite direction will raise them.

Figure 13:
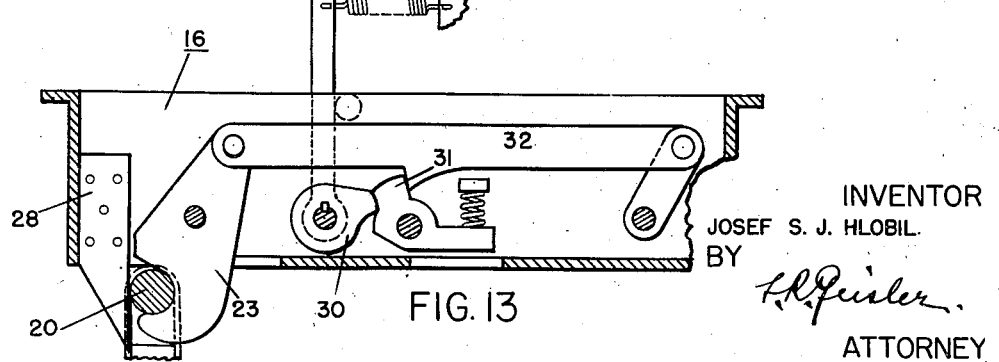
Figure 13 is an enlarged elevation of a latching mechanism for locking the freight compartment to the airplane.

Each of the pair of locking devices 16 at each side (see Figs. 12 and 13) includes a pivotally mounted hook member 23 which, in locked position, bears against a rigidly attached outside stop 28. Thus, when the hook 23 is in the locked position illustrated in Fig. 13, the bar 20 of the compartment securing rail will be held firmly and securely in position by the hook 23 and the stop 28. The locking device 16 includes any suitable mechanism for securely holding the hook 23 in locking position and also for releasing the hook quickly when desired. The mechanism illustrated in Fig. 13 is somewhat similar to the bomb shackle devices used for carrying and releasing heavy bombs, thus movement of the control lever 29 to the left, as viewed in Fig. 13, causes the attached locking disk 30 to disengage the latch 31, permitting the bar 32 to be moved to the left, but when all the parts are in the position shown in Fig. 13 the hook will be securely held in locked position as long as the control lever 29 is not operated. The control levers 29 of the four locking devices 16 are connected to a suitable central control (not shown) so that they may be operated simultaneously from within the airplane.

The locking devices 16 at each side of the fuselage body are located immediately below the wing spars 33 and 34 (Fig. 12) of the wing center section. In other words, the four points at the bottom of the carrier airplane at which the freight compartment is secured are at the strongest part of the airplane structure, causing the weight load to be carried by the wing spars.

Assuming that the freight compartment shown in Fig. 2 has been loaded and is ready for transportation the compartment is placed in a suitable location and the airplane is moved into position over the loaded compartment as shown in Fig. 6. The hoisting hook 15 at each side is then attached to the approximate center point of the securing rail on that side of the compartment, the location of the point at which the hoisting hooks are attached being the same on both sides of the compartment. If the freight compartment has been so loaded that the weight is evenly distributed and the freight compartment thus properly balanced, the attaching of the hoisting hooks at the central point of the rail at each side will enable the two hoisting hooks to lift the compartment and balance the same, whereupon the compartment will be raised until the top decks 18 are flush against the bottom surface 14 of the central body portion of the airplane, whereupon the four locking devices 16 are operated to secure the compartment to the airplane and the pull on the hoisting hooks is then released. The airplane is now loaded aid ready for a flight.

It will be noted from Fig. 6 that the hoisting cables and the drums on which they are mounted are located nearer the forward wing spar 33 and further from the rear wing spar 34. This is the proper location for the hoisting cables since the cables should be in transverse alignment with the center of gravity of the airplane and such center of gravity is customarily nearer the forward wing spar. In other words, if the center of weight of a freight compartment corresponds to the center of gravity of the carrier airplane then the freight load will be properly disposed on the airplane.

Thus far in this description it has been assumed that the freight compartment was so packed that it will be perfectly balanced when the hoisting hooks are attached to the center points of the securing rails in lifting the compartment from the ground. In all probability, however, this will not be the case. Let it now be assumed, therefore, that the loading of the compartment has resulted in more weight being placed at the forward end of the compartment. When the hoisting hooks are now attached to the centers of the securing rails and the compartment lifted slightly from the ground, the forward end will be found to tip downwardly since this is the heavier end. In such case the compartment is set back on the ground and the hoisting hooks are moved one space forward on the securing rails. The compartment is again hoisted from the ground and if the front end still tips downwardly, the hoisting hooks are again reset until the center of weight is found for the compartment. When this is done the compartment is hoisted in position and secured to the airplane in the usual manner. Although the compartment will now be located more rearwardly with respect to the airplane than if the compartment had been loaded in perfect balance at the start, this change of position of the compartment with respect to the airplane does not matter since the freight load will nevertheless be properly positioned on the airplane. Thus, even if the compartment has not been properly loaded it can nevertheless be attached in such position that the proper positioning of the freight load on the airplane is assured.

The importance of this feature of adjustably positioning the freight department can be readily understood when the difficulty and length of time required in loading cargo airplanes under ordinary circumstances are considered. One of the problems at present with the transportion of freight by air is the necessity for properly balancing the cargo load in the airplane. Due to the fact that I provide an adjustable mounting for the cargo load in my invention, the labor and time required for properly balancing the load to be carried by the airplane are reduced to the very minimum. The unloading of the cargo from the airplane also requires only a minimum of time and labor. With the airplane resting on its landing gears the locking devices are released and the freight compartment is lowered to the ground by the hoisting hooks. A second loaded freight compartment can then immediately be substituted for the compartment which has been released and the airplane will then be in readiness to continue on its way with the new cargo without delay. However, if only part of the freight is to be removed from the original compartment and the remainder is to continue on its course with the airplane, the original compartment can again be attached to the airplane. Due to the feature of adjustably positioning the freight compartment on the airplane no repacking or redistribtution of the remaining freight in the compartment will ordinarily be required, since any ordinary shifting of the weight center of the compartment, due to the unloading of part of the freight, can be offset by adjusting the relative position of the compartment on the airplane for the second stage of the journey.

The fact that the cargo load is always supported at four fixed points at the strongest part of the airplane structure, and also the fact that the load is always properly balanced in my invention, enables airplanes of minimum size empennage to be used since there will be little change in the position of the center of gravity regardless of whether the airplane is unloaded, carrying a small load, or carrying a maximum load.

There is an added advantage in the fact that in case of an emergency the airplane pilot can immediately get rid of the entire freight load, if necessary, merely by dropping the freight compartment from the airplane, without danger of hitting any part of the airplane in doing so, and consequently in such emergency a better chance is afforded to save the airplane thus lightened.

The airplane can be flown very satisfactorily without any freight load and without any freight compartment attached. The cargo airplane in itself is so designed as to be aerodynamically clean and efficient.

Although so far in this description I have referred to the freight compartment illustrated in Figures 2 and 6 as the compartment which is attached to the carrier airplane, many other types of freight compartments can be employed interchangeably. Thus, the freight compartment shown in Fig. 3, equipped with end doors 35, might be more suitable for some purposes and for some kinds of freight. In Fig. 4 I show another type of compartment suitable for carrying liquids. This compartment, in the form shown, comprises two large cylindrical tanks 36, secured to a central body support 37. It will be noted that the body support 37 of this particular compartment is not provided with securing rails similar to the rails 19 of the compartment shown in Figs. 2 and 3. The reason for this is that when the tanks 36 are full the proper balancing of the compartment load will be assured and thus no adjusting of the position of the compartment with respect to the airplane will be required. Consequently, in place of the securing rails at the sides I find it necessary with this particular type of compartment to provide merely a central hole 42 near the top of each side to be engaged by the hoisting hooks and a pair of holes 43 to be engaged similarly by the hooks of the locking devices.

Figure 5:
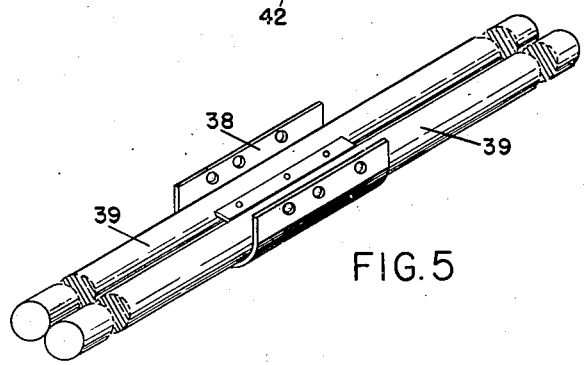

Another type of freight compartment or freight carrier is shown in Fig. 5, and may be used for carrying a pair of spars 39 secured by a clamping plate or other suitable means to the compartment 38.

Figure 8:
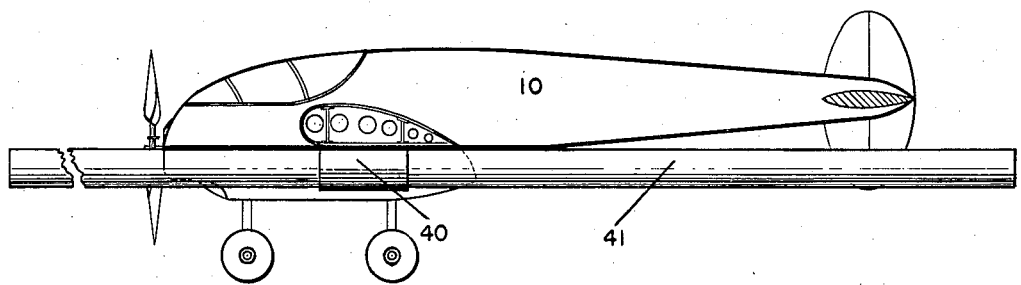
Figures 8 and 9 are side elevations of the same airplane, with the near side nacelle and wing broken away, illustrating other types of freight compartments secured to the airplane.

In Fig. 8 a long pole 41 is shown supported by the compartment 40. Additional steadying braces (not shown) can, if desired, be secured to the pole and to holding means located on the airplane bottom forwardly and rearwardly of the compartment 40. Obviously, such an article of freight could not be transported by the various cargo airplanes now being used, due to the size and length of the article of freight.

In my invention, though the pole 41 may be considerably longer than the airplane itself, the fact that the fuselage structure and empennage are located above the top of the freight compartment, with the nacelles and landing gears spaced at some distance from the sides of the same, enables objects to be carried without any necessity of limiting them to the size of the airplane.

Figure 9:
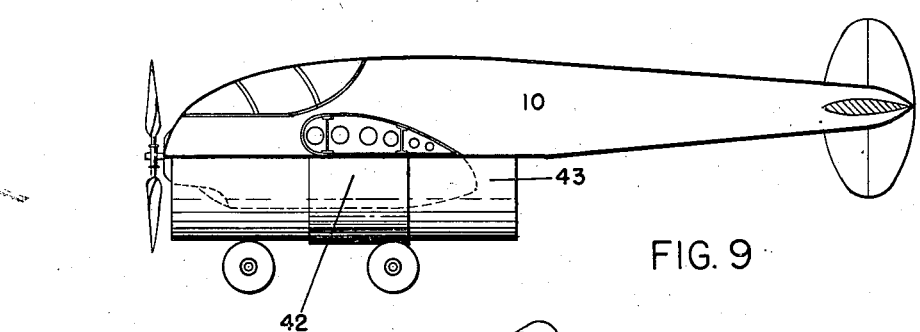

In Fig. 9 a similarly shaped compartment or carrier 42 is used for a log, tank, or other cylindrical object 43 of relatively large diameter. It would obviously be impossible to transport the article of freight illustrated in this figure with an ordinary cargo carrying airplane of the relative size shown in the figure, if the cargo were required to be placed within the airplane or carried by the airplane in the usual manner.

Although I consider the airplane shown in Fig. 1 to be the preferred form of cargo airplane for carrying out my invention, nevertheless the freight compartments can also be carried by other forms of aircraft. For example, when a cargo compartment is to be moved from an airplane landing field to a more convenient point within a city, a helicopter could be very satisfactorily used for this purpose. In Fig. 14 I show a helicopter 44 having a bottom surface 45 similar to the bottom surface 14 of the airplane of Fig. 1. The helicopter is similarly provided with a pair of hoisting hooks 15, located in the same vertical plane as the center of gravity of the helicopter, and four locking devices 16 of the type previously described. The mechanism for operating the hoisting hooks and also the control mechanism for the locking devices are the same as previously described and are located within the helicopter. Figs. 15 and 16 show a freight compartment 46 attached to the helicopter. Thus while the airplane of Fig. 1 can be used for transporting the freight compartment 46 from one city to another, the helicopter can be used for transporting the freight compartment to the roof of a warehouse within a city from the landing field, or vice versa. The freight compartment 46 is similar to that shown in Fig. 3, but obviously any type of freight compartment suitable for use with the airplane of Fig. 1 could also be used with the helicopter of Figs. 14, 15 and 16.

The freight compartments employed in my invention need not necessarily be in the form of containers, although ordinarily such form will be preferable. In Figs. 17, 18 and 19 I show a folding cargo-carrying frame which may be conveniently employed for odd pieces, shapes and sizes which can be attached to a carrying frame by ropes or cables. The frame illustrated in Figs. 17, 18 and 19, comprises two sections 47 and 48, which are hinged together along the top medial longitudinal line by hinge elements 49 through which a rod or hinge pintle 53 extends. Each section includes a plurality of pairs of transversely extending strut plates 50, and a bifurcated bracket 51 is attached at the outer end of each pair of plates 50. The two arms of the bracket 51 have registering holes through which a longitudinal bar 52 extends. The portions of the bar 52 between the bracket arms provide points at which the hoisting hooks 15 and the locking devices 16 can be attached. When the frame is not in use the sections can be swung together on the central hinge and the frame placed in the folded position shown in Fig. 19, which causes the frame to take up less room and enables it to be moved around more conveniently. When the frame is to be used with the airplane or helicopter it is held in the open position shown in Figs. 17 and 18 by inserting a rod 54 through alternate elements along the center of the frame bottom similar to the hinge elements 49 on the top. Rings, hooks or metal loops 55, secured to the bottoms of the transverse plates 50, provide convenient means for attaching ropes or cables used for securing articles of freight to the cargo frame. The frame may be covered, if desired, with any suitable material.

Obviously many other variations and modifications are possible within the scope of my invention. The types of freight compartments, the kinds of freight which can profitably be transported by the employment of different types of freight compartments under my invention, and the purposes for which standardized carrier airplanes could be used for carrying freight are practically limitless. With my invention freight can be carried to and from inaccessible locations, can be deposited on bodies of water with properly constructed compartments and with carrier airplanes having pontoons in place of the usual landing gears. I have described only a few uses of my invention by way of illustration.

Also many modifications could be made in the manner of securing the freight compartments in position on the carrier airplane. The means which I have described I have selected for the purpose of illustration due to the fact that such means shows a simple and practical manner of carrying out the principles of my invention.

I claim:

The combination of an airplane of the character described having a main bottom surface below the center wing section, the fuselage, empennage and wings of said airplane located above said bottom surface, nacelles in said airplane, said nacelles mounted in the wing structures and spaced from the main fuselage, and a detachable freight compartment adapted to be attached to said airplane below said bottom surface, hoisting means in said airplane for said compartment, said hoisting means extending downward from said bottom surface, said hoisting means including a hook at each side of said bottom surface, said hooks located substantially in the same transverse vertical plane with the center of gravity of the airplane, cooperating means on said compartment for attaching said hooks, said compartment cooperating means being located at corresponding sides of said compartment and so constructed and arranged that the points of attachment of said hooks to said compartment can be adjusted longitudinally on said compartment, whereby said hooks can be attached at points in transverse alinement with the center of weight of said compartment even though the freight in said compartment is not evenly distributed, thereby bringing the center of weight of said compartment in line with the center of gravity of said airplane when said compartment is hoisted to said airplane, locking devices in said bottom of said airplane for holding said compartment locked in position against said airplane bottom when said hoisting means has lifted said compartment into contact with said bottom, said locking devices being located directly below the two main wing spars of the wing center section of the fuselage of said airplane, whereby the weight of said compartment will always be supported at the strongest part of the airplane structure, and whereby said compartment load can be quickly and properly positioned on said airplane, the location of wings, fuselage and empennage with respect to said bottom surface making possible the carrying of oversize objects by said airplane.

JOSEF S. J. HLOBIL.

REFERENCES CITED

The following references are of record in the file of this patent:

UNITED STATES PATENTS

| Number | Name | Date |
|---|---|---|
| 1,713,069 | Barnhart | May 14, 1929 |
| 1,797,713 | Brogelli | Mar. 24, 1931 |
| 1,992,941 | Fowler | Mar. 4, 1935 |
| 2,075,042 | Knerr | Mar. 30, 1937 |
| 2,352,323 | Hooker | June 27, 1944 |
| 2,367,538 | Sullivan | Jan. 16, 1945 |
| 2,380,290 | Burnelli | July 10, 1945 |

FOREIGN PATENTS

| Number | Country | Date |
|---|---|---|
| 139,295 | Great Britain | Mar. 4, 1920 |